United States Patent

[11] 3,600,093

[72] Inventor Donald H. McMahon
   Carlisle, Mass.
[21] Appl. No. 875,138
[22] Filed Nov. 10, 1969
[45] Patented Aug. 17, 1971
[73] Assignee Sperry Rand Corporation

[54] CONTINUOUSLY BLAZED OPTICAL MONOCHROMATOR
   11 Claims, 3 Drawing Figs.

[52] U.S. Cl............................................. 356/100,
   350/162 R
[51] Int. Cl.............................................. G01j 3/18,
   G02b 5/18
[50] Field of Search........................................... 350/162,
   3.5; 356/79, 93—101

[56] References Cited
UNITED STATES PATENTS
2,339,053  1/1944  Coleman .................. 356/101
3,069,966  12/1962  White ....................... 356/100
3,098,408  7/1963  Cary ........................ 356/95 X
3,069,967  12/1962  White et al. ............... 356/100

OTHER REFERENCES
George et al., Applied Physics Letters, Vol. 9, No. 5, September 1, 1966 pages 212— 215

Primary Examiner—Ronald L. Wibert
Assistant Examiner—F. L. Evans
Attorney—S. C. Yeaton ABSTRACT: A monochromator comprising a plane mirror and a substantially planar grating which operates at the blaze angle throughout a predetermined range of input wavelengths. The mirror and grating are disposed in vertically oriented intersecting planes and rigidly affixed to one another for common rotation about the vertical axis of intersection. Light passing through the entrance aperture of the instrument and impinging on the grating is diffracted thereby onto the mirror from which it is then reflected toward an exit aperture, the wave length selected for transmission through the exit aperture being determined in accordance with the angular position of the grating-mirror combination about its rotational axis.

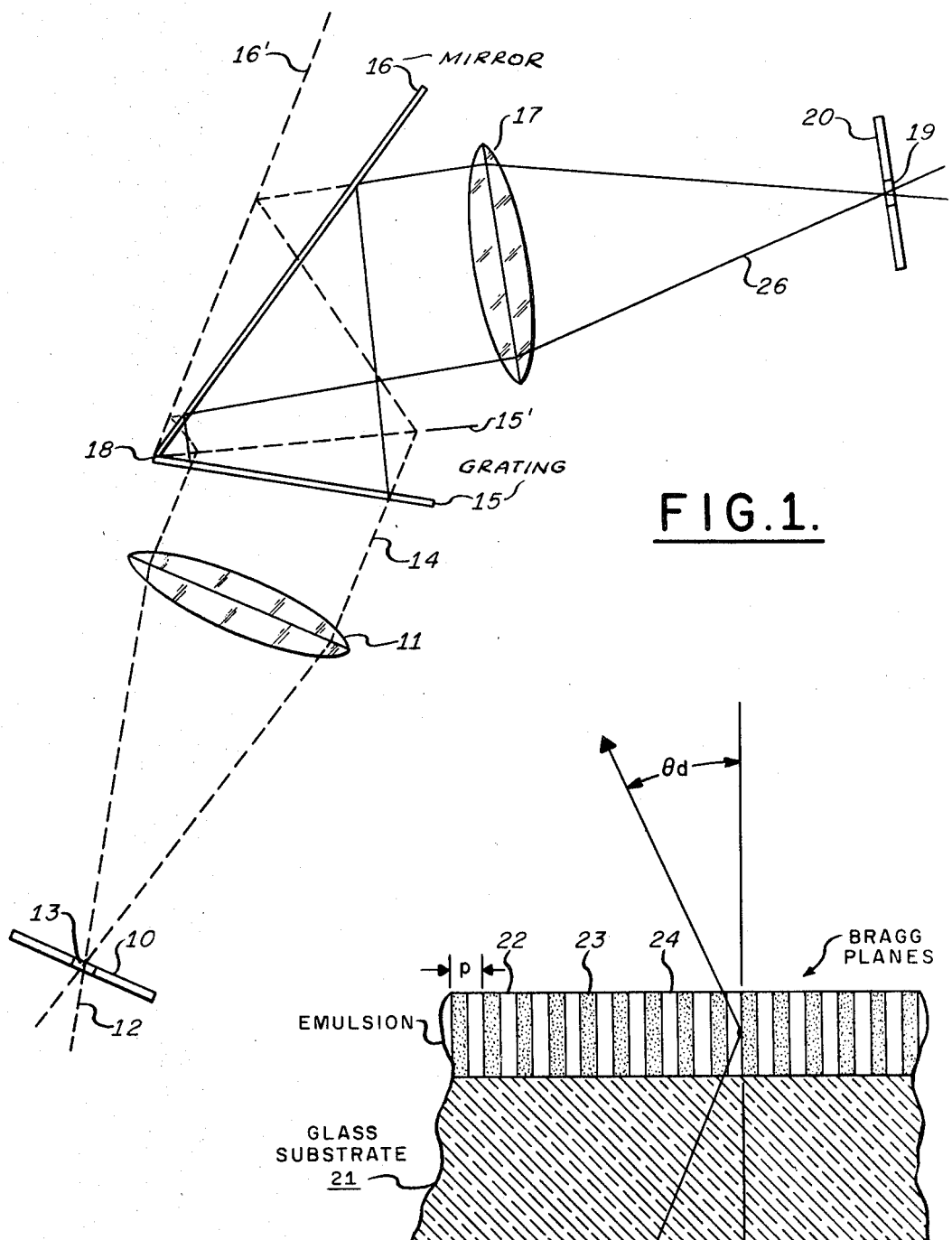

CONTINUOUSLY BLAZED OPTICAL MONOCHROMATOR

BACKGROUND OF THE INVENTION

1. Field of the Invention

This invention relates to spectroscopic devices and more particularly to grating monochromators wherein selection of discrete wavelengths or finite wave bands is achieved by virtue of the dispersive qualities of the grating with respect to the constituent wavelength components of the input light incident thereon. More specifically, the invention relates to a grating monochromator of simplified construction which optimizes efficiency by operating at the blaze angle for all wavelengths in a predetermined band while simultaneously assuring constancy of direction, position and width of the output light beam throughout the region of operation.

2. Description of the Prior Art

The inherently high resolution capabilities of grating monochromators is well known to those skilled in the spectroscopic art, and it has been appreciated heretofore that efficiency is enhanced when such instruments are constructed in a manner to minimize light losses accruing from diffraction into undesired orders. This is achieved by using a blazed grating which possesses the inherent property of concentrating the diffracted light in a predetermined order. Since efficiency is typically expressed in terms of the light intensity in a prescribed diffraction order as a fraction of the total light intensity incident on the grating, it is readily apparent that efficiency is optimized by the use of blazed gratings assuming, of course, that the entrance and exit apertures are sufficiently large to accommodate the light beams passing therethrough and that precaution is taken in accordance with conventional techniques to minimize losses due to scattering and reflection at air-optical component interfaces. Accordingly, high efficiency monochromators have been obtained in the prior art by the provision of instruments adapted to operate at the blaze angle irrespective of the wavelength increment of the input light beam selected for transmission to the output aperture.

In addition to the realization of high efficiency, it is frequently required or at least desirable in many applications to assure that the output beam characteristics remain constant for any wavelength selected for transmission to the output aperture. The requirement for constant direction, position and width of the output beam independent of wavelength has been satisfied in prior art monochromators but only at the expense of considerable complexity in the physical configuration of the apparatus or a decrease in efficiency. It is therefore a primary objective of the present invention to provide a low-cost monochromator of simplified mechanical arrangement providing both high efficiency and constancy of output beam direction, position and width for all wavelengths in a given range of operation. Moreover, prior monochromators have generally utilized reflection gratings. In the present invention, on the other hand, dispersion of the input beam is preferably achieved by transmission through the grating but, as will become apparent from the subsequent descriptive material, can also be obtained by means of a reflection grating.

SUMMARY OF THE INVENTION

In a preferred embodiment of a monochromator constructed in accordance with the principles of the present invention, the entrance aperture of the instrument is located in the front focal plane of a collimating lens or mirror which converts the input light beam to a plane wave and directs it onto a vertically oriented substantially planar grating which diffracts the light by means of transmission. A vertically disposed plane mirror skewed with respect to the grating and rigidly affixed thereto for equivalent rotation about an axis coincident with their axis of intersection operates to reflect the diffracted light such that a prescribed wavelength or narrow band of wavelengths, determined in accordance with the angular position of the grating-mirror combination about the axis of rotation, is directed by way of a lens through the exit aperture of the instrument. The grating is constructed so that it operates at the blaze angle for all values of selected output light wavelength thereby enhancing and providing more uniform efficiency in a given range of operation. Such operation is achieved by means of a grating that operates at the blaze condition when the angle of the light beam incident upon the grating relative to the grating normal is equal to the angle of the diffracted light beam relative to the normal. This is provided for at all wavelengths in a predetermined band by arranging for the blaze direction of the grating to lie in the plane of the grating.

BRIEF DESCRIPTION OF THE DRAWINGS

FIG. 1 is a simplified schematic in plan view of a preferred embodiment of the invention;

FIG. 2 is a top view of a holographic diffraction grating which is preferred for use as the grating in the embodiment of FIG. 1.

DESCRIPTION OF THE PREFERRED EMBODIMENT

Figure 3:
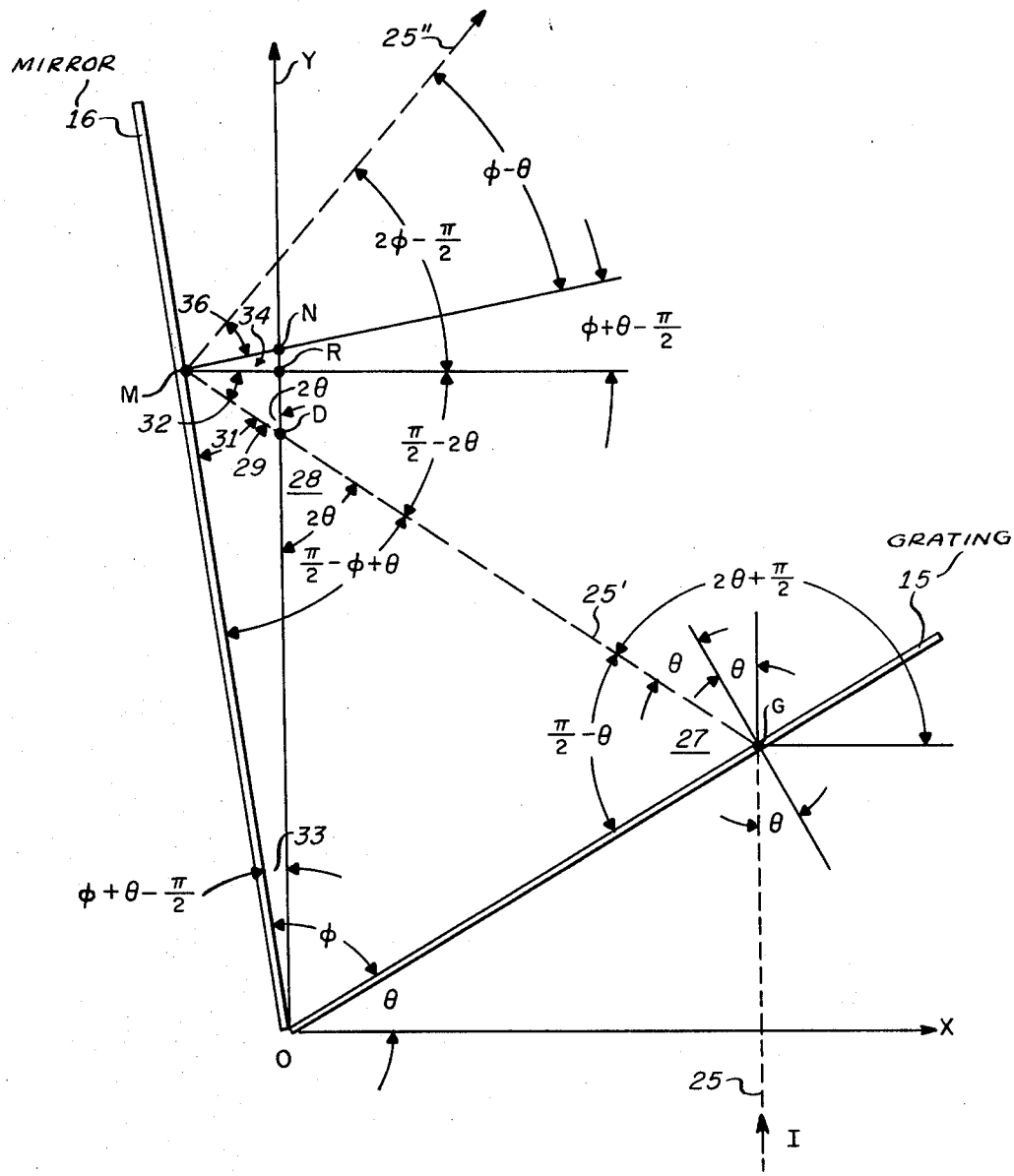
FIG. 3 is an illustration of angular relations of the grating and mirror relative to the input, diffracted, and output light beams.

Referring to FIG. 1, a preferred monochromator embodiment of the present invention comprises an aperture forming member 10 located in the front focal plane of lens 11. Light 12 entering through the aperture 13 in member 10 and striking the lens is thus collimated and directed as a plane wave 14 on to grating 15 which operates to diffract the light in the course of transmission therethrough. The grating of the illustrative embodiment is a substantially planar device oriented normal to the plane of the drawing such that the plane wave from lens 11 impinges on its front surface. For ease of description, the grating will be referred to hereinafter and in the appended claims as vertically disposed in conformance with the plan view presentation of FIG. 1. As previously explained, the grating concentrates the diffracted light in a predetermined diffraction order with the various wavelengths or wavelength increments being dispersed in accordance with the resolving power of the grating which depends, of course, on its line spacing.

Mirror 16, which is also disposed in a vertical plane, is positioned relative to the grating so as to receive the diffracted light and redirect it toward lens 17. The mirror and grating are rigidly affixed to one another for common rotation about vertically disposed axis 18 coincident their line of intersection. As shown in the figure, the vertical planes of the grating and mirror are skewed relative to one another with an angular separation therebetween about axis 18. Typically, this angular spacing is on the order of 60° to 90°, although it should be understood that there is nothing critical about these limits. The primary requirement is that the mirror be positioned so that it can receive the diffracted light and redirect it to lens 17 without interference by the grating. In operation of the monochromator, a selected wavelength is transmitted through an exit aperture 19 in member 20 located at the rear focal plane of lens 17, the selected wavelength being determined according to the angular position of the mirror and grating about axis 18 such that the direction, position and width of the output beam are maintained constant for all wavelength values.

The foregoing statement will be more fully understood after considering the constructional details of a grating and its mode of operation. Referring to FIG. 2 in conjunction with FIG. 1, a film grating constructed by holographic techniques comprises a glass substrate 21 supporting an emulsion 22 in which a diffraction pattern is formed by the alternate shaded and plane sections 23 and 24 representing respectively high and low refractive indices to light propagating through the grating. This spatially oscillating change in the index of refraction, produced by photographic exposure and subsequent processing causes a spatially varying relative phase retardation in the transmitted light resulting in the diffraction of light from the original beam into one or more orders of diffraction. Such gratings are commonly referred to as phase gratings and the manner of constructing and operating them is presently well known in the holographic art. Phase gratings are utilized in transmission-type grating monochromators in preference to absorption gratings in the interest of increasing the intensity of the light output. When the periodicity of the interference pattern, that is, the space between the sections of different refractive index, is small compared with the emulsion thickness, the grating is said to be formed by a thick-film hologram which inherently exhibits the characteristics of a blazed grating in a transmission mode and thus concentrates the diffracted light in a particular diffraction order.

For a given grating the efficiency of the diffraction process is maximized when the incident and diffracted light beams satisfy the Bragg condition which is stated mathematically by the formula $$\sin\theta_i = \sin\theta_d = (1/2)(\lambda/p) \qquad (1)$$

$p$ is the spatial periodicity of the grating and $\theta_i$ and $\theta_d$ represent the angle of the incident light beam and the angle of the defracted light beam relative to the planes formed by the interfaces of the different indices of refraction in the emulsion. These planes are commonly referred to as Bragg planes. Vertically oriented Bragg planes disposed normal to the surface of the film can be formed simply by exposing the film to two mutually coherent, uniform, equal-intensity collimated beams of laser light so arranged that the two beams strike the plate at equal angles symmetrically disposed about a normal to the film plate. The interference fringes produced in the overlap region of the two beams form planes extending through the depth of the emulsion. After developing, fixing and bleaching, the exposed planes in the emulsion become transparent regions of higher index of refraction than the intermediate unexposed regions. Gratings constructed in this manner provide for the blaze direction to lie substantially in the plane of the grating. In essence, the Bragg condition states that the first order diffracted light is maximized (blazed) when the grating is oriented so that the diffracted light is produced by specular reflection of the incident light beam off the Bragg planes in the emulsion and further that the blaze occurs for the particular wavelength satisfying the requirements of equation (1) for a given angle of incidence on the grating. Light of any wavelength will be specularly reflected off the Bragg planes, but the angle of specular reflection will be equal to the angle of diffraction (the condition for blazed diffraction) only for the wavelength which satisfies the conditions of the Bragg equation. It should, therefore, be readily apparent that in the case of a collimated input light beam comprising a multiplicity of wavelength components, only one component will be diffracted at the blaze angle where the angle of diffraction is equal to the angle of incidence. Thus, as the grating is rotated about axis 18, the angle of incidence of the input beam on the grating is altered whereupon the Bragg equation is satisfied for different wavelengths. Rotation of the mirror in common with the grating assures that the wavelength diffracted at the blaze angle is transmitted through output aperture 19. Two discrete grating and mirror positions are illustrated by the solid and dashed line notations 15, 15' and 16, 16', respectively, in FIG. 1. For both positions, it is indicated that the output beams 26 have equivalent widths and travel in the same direction so as to pass through exit aperture 19 at identical lateral positions relative to rotational axis 18. As explained above, a different diffracted wavelength component of the input beam is reflected from mirror 16 onto exit aperture 19 for each discrete angular position of the grating and mirror. Obviously the direction of the output beam relative to the input beam can be arranged as desired simply by inserting an additional stationary flat mirror in the path of either the input or output beam.

It now remains to be shown that the conditions depicted in FIG. 1 actually obtain. This is facilitated by means of a simple analytical treatment as follows. Referring to FIG. 3, the grating 15 and mirror 16 are indicated as intersecting and rotating about an axis 18 located at the origin of an X–Y coordinate system. The plane wave incident on the grating is designated by line 25 representing the central axis of the beam at an angle $\theta$ with respect to the grating normal. Using a different value of "$a$" for each edge of the beam, either edge can be represented by the equation $$x = a \qquad (2)$$

With the grating at an angle $\theta$ with respect to the $x$ axis, the point of interception of the input light beam and the grating is, $$x = a, \quad y = a\tan\theta \qquad (3)$$

Similarly, the position of the grating can be represented by $$x\sin\theta - y\cos\theta = 0 \qquad (4)$$

and the position of the mirror by $$x\sin(\theta + \Phi) - y\cos(\theta + \Phi) = 0 \qquad (5)$$

where the plane of the mirror is at an angle $\Phi$ with respect to the grating. Inasmuch as the Bragg condition is satisfied when the angles of incidence and diffraction are equal, then for a grating in which the Bragg planes are normal to the grating surface, the diffracted light beam 25' of interest for passage through the exit aperture, namely, the blazed wavelength, will be at an angle $2\theta$ relative to the direction of input beam 25 as is apparent from the geometry of the drawing. Diffracted beam 25' is therefore at an angle $2\theta + \pi/2$ measured counter-clockwise from the $x$ axis. Since both the point of origin of the diffracted beam ($x=a$, $y=a\tan\theta$) and its direction relative to the $x$ axis ($2\theta+\pi/2$) are known, the diffracted beam can be represented by $$(x-a)\cos 2\theta + (y-a\tan\theta)\sin 2\theta = 0 \qquad (6)$$

Equations 5 and 6 representing the mirror 16 and diffracted beam 25', respectively, can be solved simultaneously to ascertain the position at which the diffracted beam strikes the mirror and accordingly provides the coordinates $$x = \frac{a \cos(\theta + \phi)}{\cos(\theta - \phi)}, \quad y = \frac{a \sin(\theta + \phi)}{\cos(\theta - \phi)} \qquad (7)$$

The direction of the output beam 25'' can be ascertained from the drawing where angle 27 is seen to be equal to $\pi/2 - \theta$ and angles 28 and 29 equal to $2\theta$. Accordingly, from triangle OGM, angle 31 is found to equal $(\pi/2) - \Phi + \theta$ and from triangle DRM, line RM being parallel to the $x$ axis, angle 32 is found to equal $(\pi/2) - 2\theta$. Then from triangle ORM angle 33 is determined to be $\Phi + \theta - (\pi/2)$ which is equal to angle 34 defined by line RM and line NM which is normal to the mirror. Hence, the angle of incidence of diffracted beam 25' on mirror 16 relative to the mirror normal NM is equal to angle 32 + angle 34 or $(\Phi - \theta)$, which is also equal to the angle of reflection 36. Thus, output beam 25'' is at an angle equal to the sum of angles 34 and 36 or $(2\Phi - \pi/2)$ with respect to the fixed $x$ axis.

From a knowledge of both the position of output beam 25'' at the mirror and its direction relative to the $x$ axis it can be shown to be representable by an equation of the form $$x\cos 2\Phi + y\sin 2\Phi = a \qquad (8)$$

This equation is independent of the angle $\theta$ and as a consequence, the direction and position of the edges of the output beam are a function of only parameters $\Phi$ and "$a$" which are fixed in a given monochromator design. As a result, rotation of the grating-mirror combination about an axis at the origin of the coordinate system produces a simultaneous change in both the angles of incidence and diffraction thereby causing different wavelengths to be diffracted in the direction of output beam 25'. Further, since the angle of the diffracted beam relative to the grating normal is equal to the angle of the incident input beam relative to the normal, the blaze condition is maintained for any value of $\theta$. The fact that the output beam width remains constant for all wavelengths can be intuitively appreciated simply by noting that the refraction conditions are alike upon both entering and leaving the film grating.

While the invention has been described with reference to a holographic transmission grating, it is to be understood that other kinds of gratings can be used. For instance, a conventional ruled grating can be used if desired. It has been found, however, that degradation of the output beam characteristics is likely to occur. In particular, the beam width will not be constant and the output beam lateral position will be adversely affected if the axis of rotation is coincident with the axis of intersection of the grating and mirror. Nevertheless, a mathematical analysis similar to that presented above can be used to choose an axis of rotation for which the lateral beam position is the same at three appropriately distributed angular orientations of the grating-mirror combination. It should also be noted that the output beam characteristics are similarly affected in the case of holographic diffraction gratings constructed with the blaze direction out of the plane of the grating. Further, it should be recognized that a thick, absorptionless grating produced by a sinusoidal varying index of refraction will diffract a fraction, $S=-i\sin(\pi \Delta n d/\lambda \cos\theta)$ of the incident light beam amplitude into first order. Here $\Delta n$ is the amplitude change in index of refraction, $d$ is the thickness of the photographic emulsion, and $\theta=\theta_i=\theta_d$ is the Bragg angle. Because of the dependence of the amplitude of the diffracted light on $\lambda$ and $\Delta n$, even a monochromator employing a holographically produced grating, which maintains the blaze condition, can have a high efficiency over only a finite wavelength range. Consequently, different gratings may have to be used to obtain extended wavelength coverage at high efficiency.

I claim:

1. A monochromator comprising
    means forming an entrance aperture for receiving input light applied to the monochromator,
    a blazed diffraction grating having vertically oriented grating lines whereby the blaze direction lies in a horizontal plane,
    first light directing means positioned in the path of the light propagating through the entrance aperture for directing the light onto the grating,
    a vertically disposed reflecting surface positioned to receive light diffracted by the grating,
    means forming an exit aperture for emitting light from the monochromator, and
    second light directing means positioned in the path of diffracted light reflected from the reflecting surface for directing said reflected light through said exit aperture, and
    said reflecting surface being mounted for equivalent rotation with said grating about a common axis parallel to the grating lines such that for light of a wavelength selected for transmission through said exit aperture, in accordance with the angular orientation of the grating-reflecting surface combination relative to the light incident on said grating, the diffraction angle of said selected light relative to a normal to the blaze direction of the grating is equal to the angle of light incidence on said grating relative to said normal thereby maintaining a blazed diffraction condition for said selected wavelength irrespective of the angle of said normal relative to said incident light.

2. The apparatus of claim 1 wherein the grating is a holographic plate having an interference pattern formed therein represented by alternate sections of high and low refractive index defining vertically disposed Bragg planes having a spatial periodicity which is small compared to the thickness of the grating whereby the holographic plate is inherently blazed.

3. The apparatus of claim 2 wherein the vertically disposed Bragg planes are oriented normal to a major surface of the grating, thereby maintaining a constant width for the output light transmitted through the exit aperture irrespective of the wavelength of said output light.

4. The apparatus of claim 2 wherein the wavelength of the diffracted light which is blazed for transmission to the exit aperture is determined according to the relation $\sin\theta_i=\sin\theta_d=(1/2)(\lambda/p)$ where $p$ is the spatial periodicity of the grating, $\theta_i$ and $\theta_d$ are the angles of incidence and diffraction at the grating and $\lambda$ represents wavelength.

5. The apparatus of claim 2 wherein the blaze direction lies substantially in the plane of the grating.

6. The apparatus of claim 1 wherein the grating and reflecting surface are substantially planar devices positioned in respective vertically oriented planes skewed relative to one another about said axis of rotation.

7. The apparatus of claim 6 wherein the respective planes in which said grating and reflecting surfaces are located intersect along a line coincident with said axis of rotation.

8. The apparatus of claim 7 wherein the first and second light directing means are respective first and second lenses placed such that the entrance aperture is located in the front focal plane of said first lens and the exit aperture is positioned in the rear focal plane of said second lens.

9. The apparatus of claim 7 wherein the grating is a holographic plate having an interference pattern formed therein represented by alternate sections of high and low refractive index defining vertically disposed Bragg planes having a spatial periodicity substantially smaller than the thickness of the grating.

10. The apparatus of claim 9 wherein the vertically disposed Bragg planes are oriented normal to the plane of grating.

11. The apparatus of claim 9 wherein the blaze direction lies substantially in the plane of the grating.